April 23, 1968 E. F. OSBORNE ET AL 3,379,977

EXTENDED RANGE AGC

Filed June 10, 1964 2 Sheets-Sheet 1

INVENTORS
Eugene F. Osborne
Leslie D. Thomas
BY Claude Funkhouser
ATTORNEY
Roger T. Frost
AGENT

EXTENDED RANGE AGC

Filed June 10, 1964 2 Sheets-Sheet 2

Detector Characteristics, AGC

United States Patent Office 3,379,977
Patented Apr. 23, 1968

3,379,977

EXTENDED RANGE AGC

Eugene F. Osborne and Leslie D. Thomas, Baltimore, Md., assignors, by mesne assignments, to the United States of America as represented by the Secretary of the Navy Filed June 10, 1964, Ser. No. 374,211
13 Claims. (Cl. 325—399)

ABSTRACT OF THE DISCLOSURE

This disclosure is directed to a phase-lock tracking receiver with AGC detection. In this device an IF signal is received and fed through mixers and amplifiers to a first phase detector where it is compared with a reference signal. A difference signal is fed from the detector to a local oscillator and thence to one of the mixers to adjust the phase of the IF signal. The output of the amplifiers is also connected to a frequency divider and a detector. A reference signal is also connected to the detector. The output of the detector, which is a function of the amplitude of the IF signal and the phase difference between the IF signal and the reference signal is fed to the AGC where it is modified. The output of the AGC is connected to adjust the gain of the amplifiers and consequently the amplitude of the IF signal. This system is advantageous because it provides excellent stabilization of receiver gain in the presence of larger phase error.

Figure 1:
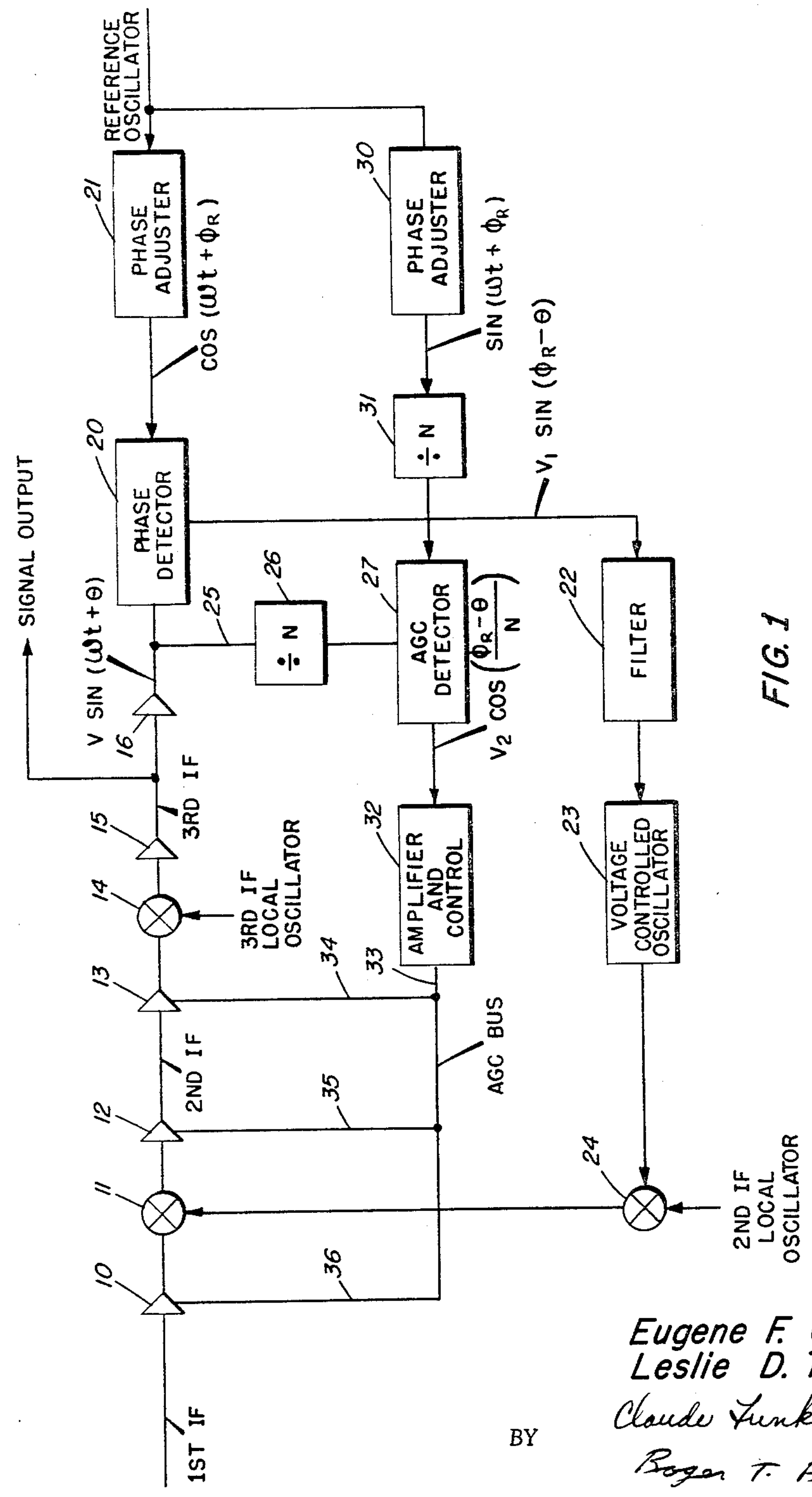

This invention relates in general to automatic gain control and in particular to an automatic gain control system for use in phase-locking tracking receivers.

The utility and general function of AGC (automatic gain control) circuits in radio receivers is well known to those skilled in the art. By means of the use of AGC circuits the output of a receiver may be held at a relatively constant level even though the input signal varies greatly in magnitude. The use of such circuits is highly desirable in voice or other communication receivers and becomes essential with the use of types of modulation wherein intelligence is conveyed by the strength or magnitude of the modulation signal.

The present invention relates to an AGC system especially intended for use in phase-lock tracking receivers. In such a receiver the IF signal is sampled and its phase is compared with the phase of a reference oscillator in the receiver. Any difference in phase between these two signals is used to control the frequency of the receiver local oscillator so that the phase of the IF signal will be brought into step or "locked" with the phase of the reference oscillator.

In operation, the bandwidth of the predetector is large and the signal to noise ratio (SNR) is normally less than one. When the SNR is less than one the noise signal will predominate and the normal AGC loop would be responsive to the noise and not to the signal. This problem can be solved, as in this invention, by making the AGC loop phase responsive and by phase locking the input signal to a signal from a reference oscillator. The AGC loop is tied to the same reference oscillator and as noise is random in phase, the loop will be primarily responsive to the input signal and not the noise signal.

AGC circuits designed for use with such receivers work well in the absence or near absence of any phase difference. However, the effectiveness of these AGC circuits drops off rapidly in the presence of relatively large phase differences. This decrease in AGC effectiveness is particularly critical because of the fact that it occurs at or before the threshold of the phase-lock system.

Accordingly, it is an object of this invention to provide an improved means of stabilizing receiver gain.

It is another object of this invention to provide an automatic gain control for a receiver.

A further object of this invention is to provide improved gain regulation in a phase-lock tracking type receiver.

Still another object is the provision of a phase-lock tracking type receiver having an automatic gain control.

Yet another object is the provision of a phase-lock tracking receiver having improved gain regulation in the presence of large phase errors in the tracking loop.

Another object is the provision of a phase-lock tracking receiver in which the AGC action may be initiated even though the phase error exceeds the theoretical threshold of 90°.

Figure 2:
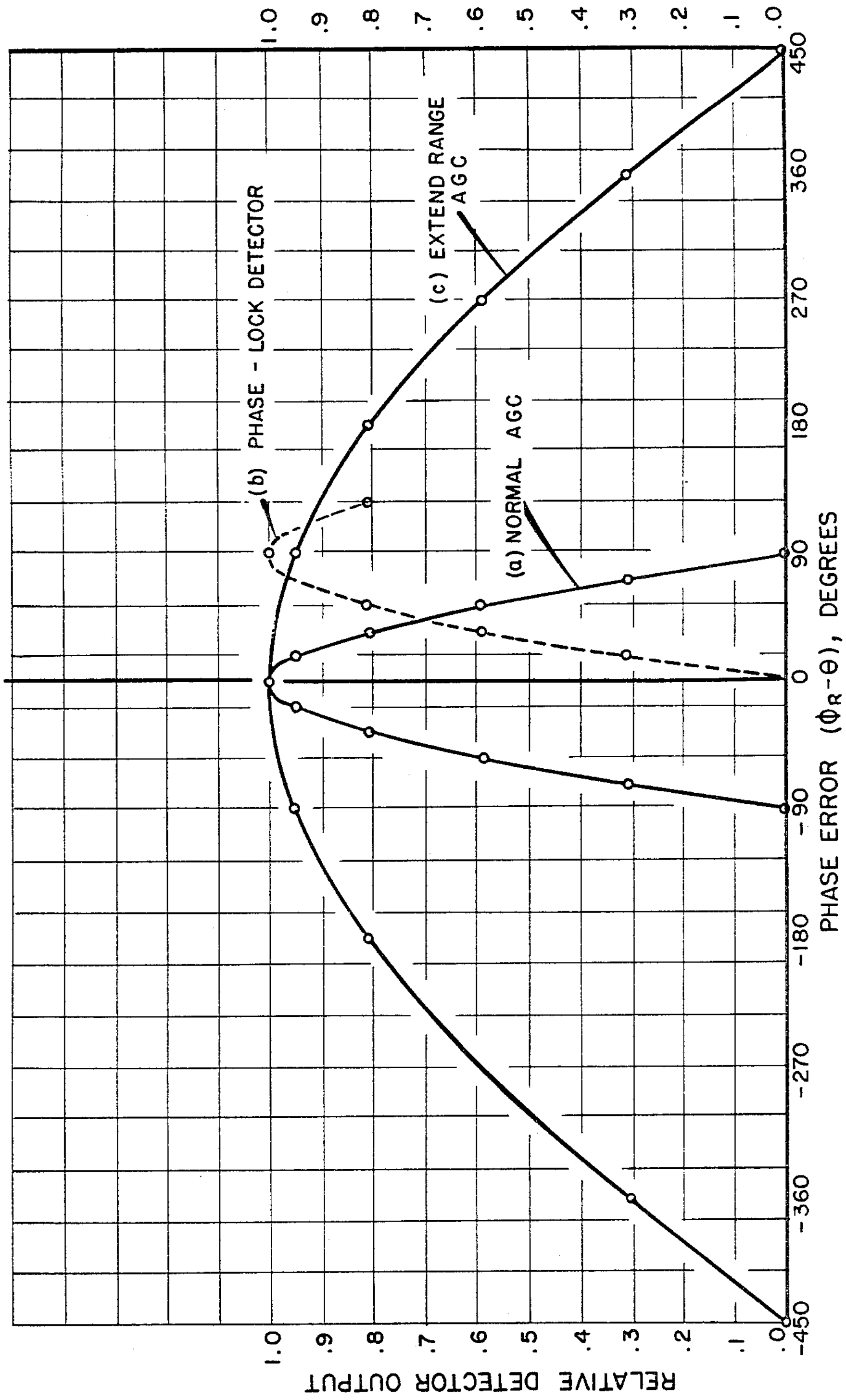

The exact nature of this invention as well as other objects and advantages thereof will be readily apparent upon consideration of the following specifications relating to the annexed drawing in which:

FIG. 1 is a block diagram of a portion of a receiver according to this invention; and FIG. 2 graphically depicts the output of the phase-lock detector of a conventional AGC and of the AGC of this invention over various phase differences.

Referring now to FIG. 1, there is shown a portion of a radio receiver beginning with the first IF stage and including the phase-lock loop and the AGC loop. The output from the first IF stage is received and amplified in the first IF amplifier 10 and is then passed on to the first mixer 11. There the first IF signal is mixed with the output from the second local oscillator and from the voltage controlled oscillator 23 as will be described later. The output of the first mixer is passed on to the second IF stage including second IF amplifier 12 and 13. The output of the second IF stage is received by second mixer 14, which also receives a signal of fixed frequency from a third IF local oscillator. The output of the second mixer 14 is received into a third IF stage including a third IF amplifier 15.

From the output of the third IF amplifier there is taken a signal to be supplied to other portions of the receiver for signal utilization purposes. This output is also supplied to amplifier 16. The output of amplifier 16 is supplied to one of the inputs of phase-lock detector 20. The other of the inputs of the phase-lock detector 20 is supplied with a signal from a reference oscillator through phase adjuster 21. The output of phase-lock detector 20 is filtered in filter 22 and then is passed to voltage control oscillator 23. The output of oscillator 23, whose frequency is a function of the output of phase-lock detector 20, is passed to local oscillator mixer 24 which also receives the signal from the second local oscillator. The outputs of the second local oscillator and of the voltage controlled oscillator 23 are combined in local oscillator mixer 24 to provide a local oscillator signal supplied to the first mixer 11.

It has been discovered that the operation of the AGC feedback loop can be greatly enhanced by the expedient of operating the AGC detector at a fractional frequency of that used in the phase-lock loop. To this end the output of IF amplifier 16 is passed via line 25 through frequency divider 26 to AGC detector 27. The frequency output of frequency divider 26 is $1/N$ times the frequency of the third IF section. The AGC detector 27 also receives a reference signal from the receiver reference oscillator. This signal passes through a phase adjuster 30 and through another frequency divider 31 similar in function to divider 26; thus there will be seen that under phase-lock conditions both inputs of the AGC detector 27 will be of the same frequency. AGC detector 27 functions as a phase detector and may be similar in nature to phase-lock detector 20.

The output of the AGC detector 27, which is a function of the amplitude of the IF signal at amplifier 16 and the phase difference of the two inputs of the AGC detector is passed on to amplifier and control unit 32. This unit modifies the output of AGC detector 27 in accordance with the desired AGC characteristics of the receiver. The output as modified is then amplified and passed on to AGC bus 33. From this bus the AGC signal is passed to the various amplifiers such as 10, 12 and 13 through AGC lines 36, 35 and 34 to thereby adjust the gain of the amplifiers and consequently the amplitude of the IF signal. As in standard AGC circuits, the amplification is adjusted inversely as the strength of the IF signal. Of course, it will be understood that the showing of only three amplifiers as having AGC control is merely illustrative and is not intended to imply a limitation on the number of IF amplifiers that may be so equipped.

Turning now to the operation of the system, it will be noted that the phase of the reference signals as applied to phase-lock detector 20 and AGC detector 27 has been tuned by phase adjusters 21 and 30 so that the output of phase-lock detector 20 is a sine function of any phase difference between the two inputs to the phase-lock detector whereas the output of the AGC detector 27 is a cosine function of any phase difference between its input signals. This is shown graphically in FIG. 2 wherein plot (*b*) shows the output of phase-lock detector 20 and plot (*c*) shows the output of the AGC detector 27. When there is no phase difference between the two inputs of the phase-lock detector 20, the output of the detector will be zero and phase-lock conditions will prevail. The existence of phase difference will produce an output whose polarity is dependent upon the direction of the phase difference. This output will cause the frequency of voltage controlled oscillator 23 to vary whereby the frequency of the third IF section will ultimately be changed to reduce the phase difference to zero and thus to reinstate phase-lock conditions.

The output of AGC detector 27, being a cosine function of the phase difference, will be at a maximum at zero difference or at phase-lock condition. Because of this the strongest AGC signal will be produced at this time. As seen in FIG. 2, however, the output of the AGC detector falls off gradually with respect to increased phase difference even though this phase difference exceeds the 90° plus or minus theoretical limit of operation of the phase-lock detector. The AGC output of this invention thus is in sharp contrast to the normal AGC output of the prior art as shown by plot (*a*) in FIG. 2. In one system to which this invention was applied using frequency division of $N=5$ the output of the AGC circuit at a phase error of 90° dropped only to 0.951 of maximum, or 0.4 db.

In one application of this invention the input of the first IF was nominaly 22 mc. A second IF frequency of 4.5 mc. was obtained by means of a second local oscillator input frequency of 18 mc. into local oscillator mixer 24 combined with a nominal output of the voltage controlled oscillator 23 of 500 kc. A third IF local oscillator frequency of a 4 mc. was supplied to second mixer 14 producing a third IF frequency of 500 kc. The output of the reference oscillator was also 500 kc. Thus, assuming that phase-lock conditions prevail, the inputs to phase-lock detector 20 are both of the same frequency and phase. With the frequency division of $N=5$ and under phase-lock conditions the inputs to AGC detector 27 will each be at the frequency of 100 kc.

For this system to functions as presented herein the frequency dividers 26 and 31 in the AGC detector circuit must have a linear output-input characteristic. Because of the action of the AGC linearity is required only over a small range of about 10 db, not over the full dynamic range of the receiver.

Various modifications are contemplated and may obviously be resorted to by those skilled in the art without departing from the spirit and scope of the invention as hereinafter defined by the appended claims as only a preferred embodiment thereof has been disclosed.

What is claimed is:

1. A receiver gain regulation circuit comprising:
at least one IF stage having an input responsive to a received signal;
amplification means contained in said IF stage;
reference signal source means, phase responsive means connected to receive the output of said IF stage and a first reference signal from the reference signal source means for producing an output signal indicative of the variation of the phase of the output of the IF stage from the first reference signal;
means responsive to the output signal of said phase responsive means to modify the frequency of the signal in said IF stage whereby said phase variation is minimized;
frequency divider means connected to receive the output of said IF stage;
detector means connected to the output of the frequency divider and the second reference signal, the output of the detector means being a function of the amplitude of the output of the IF means and the variation in phase of the frequency divider and the second reference signal; and
means responsive to the output of the second phase detector to control the gain of said amplification means.

2. Apparatus as in claim 1 wherein the second reference signal is of the same frequency as the output of the frequency divider means.

3. Apparatus as in claim 2 wherein the output of the phase responsive means is a sine function of the phase variation of the IF stage output from the reference signal and the output of the detector means is a cosine function of the phase variation.

4. Apparatus as in claim 1 further comprising second frequency divider means connected to receive an output from the reference signal source means, the second frequency divider means reducing the frequency of the output of the reference signal source means by the same degree that the first frequency divider means reduces the frequency of the output of the IF stage, whereby the output of the second frequency divider means constitutes the second reference signal.

5. A receiver gain regulation circuit comprising:
a first IF stage including amplifier means;
local oscillator means, mixer means connected to receive the output of the first IF stage and the local oscillator;
at least one other IF stage including amplifier means;
reference signal source means phase responsive means having two inputs and an output, one of said inputs connected to receive the output of said other IF stage and the other of said inputs connected to receive a reference signal from the reference signal source means of the same nominal frequency as that of the output of said other IF stage, the output of the phase detector means being a function of the phase difference between its two inputs;
oscillator means connected to receive the output of the phase responsive means, the frequency of operation of the oscillator means being responsive to this output to control the frequency of said local oscillator signal;
first frequency divider means connected to receive the output of said other IF stage;
second frequency divider means connected to receive said reference signal;
detector means connected to receive the outputs from both of said frequency divider means, the output of the detector means being a function of the amplitude of the output of said other IF stage and the phase difference between its two inputs; and means for supplying the output of the detector means to at least one of the amplifier means to control the gain thereof whereby regulation of the receiver gain is obtained.

6. Apparatus as in claim 5 wherein said output function of the phase responsive means is a sine function and said output function of the detector means is a cosine function.

7. A receiver gain regulation circuit comprising:

a first IF stage including amplifier means;

first local oscillator means;

first mixer means connected to receive the output of the first IF stage and the first local oscillator;

second IF stage connected to receive the output from said first mixer means, the second IF stage including at least one amplifier means;

second local oscillator means;

second mixer means connected to receive the output of the second IF stage and the second local oscillator;

third IF stage connected to receive the output from the second mixer means, the third IF stage including at least one amplifier means;

reference signal source means;

phase responsive means having two inputs and an output, one of said inputs connected to receive the output of the third IF stage and the other of said inputs connected to receive a reference signal from the reference signal source means of the same nominal frequency as that of the output of the third IF stage, the output of the phase responsive means being a function of the phase difference between its two inputs;

oscillator means connected to receive the output of the phase responsive means, the frequency of operation of the oscillator means being responsive to this output and controlling the frequency of said first local oscillator signal;

first frequency divider means connected to receive the output of the third IF stage;

second frequency divider means connected to receive said reference signal;

detector means connected to receive the outputs from both of said frequency divider means, the output of the detector means being a function of the amplitude of the output of the third IF stage and the phase difference between its two inputs;

means for supplying the output of the detector to at least one of said amplifier means to control the gain thereof whereby regulation of the receiver gain is obtained.

8. Apparatus as in claim 7 wherein the output of the phase responsive means is a sine function of the phase difference between its two inputs and the output of the detector means is a cosine function of the phase difference between its two inputs, whereby at conditions of zero phase difference the output of the phase responsive means is minimized and the output of the detector is maximized.

9. In a receiver of the type including at least one IF stage with amplifier means and a reference signal source wherein a local oscillator source is phase-locked with a first reference signal from the reference signal source to obtain increased receiver stability, the improvement in receiver automatic gain control circuitry comprising:

a frequency divider connected to the output of the amplifier means;

detector means connected to receive the output from the frequency divider and comparing this output with a second reference signal from the reference signal source, the output of the detector means being a function of the amplitude of the output of the IF stage and the phase difference between the output of the frequency divider and the second reference signal; and means responsive to the output of the detector means to control the gain of the amplifier means.

10. The invention of claim 9 wherein the output function of the detector is a cosine function.

11. The invention of claim 10 wherein the output frequency of the frequency divider means is a whole number subharmonic of its input frequency.

12. The invention of claim 11 wherein the second reference signal is of the same frequency as the nominal output frequency of the frequency divider means.

13. Apparatus as in claim 12 further comprising second frequency divider means connected to receive the output of the first reference signal source, said first frequency divider means and said second frequency divider means having substantially identical frequency division characteristics, whereby the output of the second frequency divider means constitutes the second reference signal.

References Cited

UNITED STATES PATENTS 3,341,778 9/1967 Dryden ------------ 325—305

WILLIAM C. COOPER, *Primary Examiner.*

KATHLEEN H. CLAFFY, *Examiner.*

R. LINN, *Assistant Examiner.*